United States Patent [19]

Henzi

[11] 3,926,941
[45] Dec. 16, 1975

[54] AZO DYES HAVING A TRIAZOLIUM DIAZO COMPONENT RADICAL WITH A FUSED CYCLOALKYL RING

[75] Inventor: Beat Henzi, Neuallschwil, Switzerland

[73] Assignee: Sandoz, Ltd., Basel, Switzerland

[22] Filed: Aug. 8, 1973

[21] Appl. No.: 386,775

[30] Foreign Application Priority Data
Aug. 10, 1972 Switzerland............... 11843/72

[52] U.S. Cl.......... 260/146 R; 260/146 D; 260/147; 260/154; 260/156; 260/157; 260/162; 260/308 R; 260/293.55
[51] Int. Cl.² ............... C09B 29/36; D06P 1/41
[58] Field of Search........... 260/146 R, 146 D, 147, 260/154, 155, 156, 157, 162

[56] References Cited
UNITED STATES PATENTS

| | | | |
|---|---|---|---|
| 3,102,878 | 9/1963 | Baumann et al. | 260/157 X |
| 3,133,910 | 5/1964 | Baumann et al. | 260/146 R |
| 3,417,075 | 12/1968 | Mingasson et al. | 260/157 X |
| 3,573,272 | 3/1971 | Kaupp et al. | 260/146 D |
| 3,585,182 | 6/1971 | Straley et al. | 260/158 X |
| 3,595,852 | 7/1971 | Hahn et al. | 260/158 |
| 3,654,259 | 4/1972 | Iizuka et al. | 260/146 R X |
| 3,679,656 | 7/1972 | Iizuka et al. | 260/146 R X |
| 3,691,148 | 9/1972 | Peter et al. | 260/158 |
| 3,717,625 | 2/1973 | Peter et al. | 260/158 |
| 3,763,140 | 10/1973 | Entschel et al. | 260/157 X |
| 3,770,719 | 11/1963 | Fisher et al. | 260/158 |

Primary Examiner—Floyd D. Higel
Assistant Examiner—C. F. Warren
Attorney, Agent, or Firm—Gerald D. Sharkin; Richard E. Vila; Melvyn M. Kassenoff

[57] ABSTRACT

Disclosed are basic azo dyes, free from water solubilizing groups, of formula I,

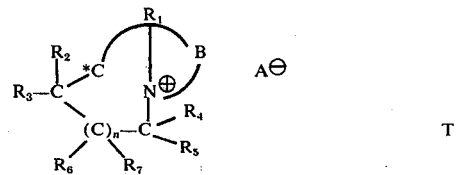

T wherein
$R_1$ is alkoxy, cycloalkyl or substituted or unsubstituted alkyl or alkenyl,
$R_2$, $R_3$, $R_4$, $R_5$, $R_6$ and $R_7$, independently, are hydrogen, alkyl, cycloalkyl or phenyl,

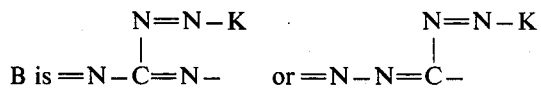

K is a coupling component radical,
$A^\ominus$ is an anion, and
$n$ is 1 to 10,
the production thereof and the use thereof in dyeing and printing synthetic polymer textile substrates and dyeing plastics in the mass, leather and paper.

26 Claims, No Drawings

AZO DYES HAVING A TRIAZOLIUM DIAZO COMPONENT RADICAL WITH A FUSED CYCLOALKYL RING

IMPROVEMENTS IN OR RELATING TO ORGANIC COMPOUNDS

The present invention relates to basic azo dyes, free from sulphonic acid groups, their production and use.

The invention provides basic azo dyes of formula I,

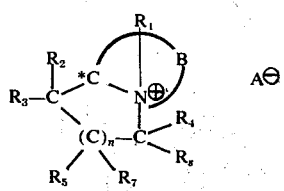

in which
- $R_1$ signifies an unsubstituted or substituted alkyl or alkenyl radical, which alkyl and alkenyl radicals contain up to 4 carbon atoms, an alkoxy radical of 1 to 4 carbon atoms or a cycloalkyl radical containing 5 to 7 ring carbon atoms,
- each of $R_2$, $R_3$, $R_4$, $R_5$, $R_6$ and $R_7$, which may be the same or different, signifies a hydrogen atom, an unsubstituted $(C_{1-4})$ alkyl, $(C_{5-7})$ cycloalkyl or phenyl radical,
- B signifies a radical of formula II or IIa,

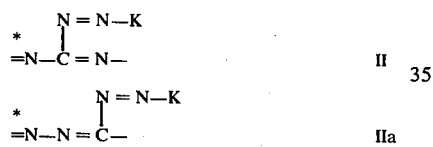

in which the end marked * is, in each case, bound to the carbon atom bearing the same mark, and
- K signifies the radical of a coupling component,
- $A^{\ominus}$ signifies an organic or inorganic anion, and
- $n$ is 1 to 10, which compounds are free from anionic groups which make the compounds soluble in water, in particular from sulphonic acid groups.

The invention also provides a process for the production of a compound of formula I, as defined above, characterized by quaternating a compound of formula

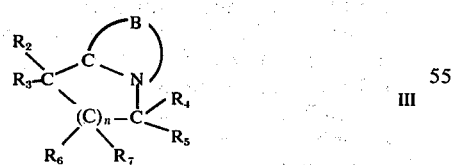

in which $R_2$, $R_3$, $R_4$, $R_5$, $R_6$, $R_7$ and B are as defined above,
with a compound of forumla IV, $$R_1 - A \qquad IV$$

in which
- $R_1$ is as defined above, and
- A signifies a radical convertible to the anion $A^{\ominus}$ as defined above, or by reacting an $R_1$ yielding epoxide or saturated or unsaturated acid amide with a compound of formula III, as defined above, in the presence of an acid HA.

The quaternation may be accomplished in conventional manner; for example, the reaction may be carried out in an inert solvent, in an aqueous suspension or, if the quaternating agent is liquid under the reaction conditions, in the absence of solvent using an excess of the quaternating agent. Where necessary, the reaction may be carried out at elevated temperatures and in a buffered medium.

Suitable quaternating agent of formula IV include alkyl halides, such as, methyl or ethyl chloride, bromide or iodide, alkylsulphates, such as dimethylsulphate or benzyl chloride. Other quaternating agents include a mixture of acrylic acid amide and hydrohalides, such as $CH_2=CH-CO-NH_2/HCl$, chloracetic acid amide, epoxides, such as ethylene or propylene oxide or epihalohydrin in the presence of an acid of formula HA.

In the compounds of formula I, K may be a radical of a coupling component of the benzene or naphthalene series, such as amino or hydroxy benzenes or naphthalenes, of the heterocyclic series, such as pyrazolone or aminopyrazole series, indole or carbazole series, advantageously 2-phenylindole series, barbituric acid series, or of the aliphatic series such as the alkane, alkene or alkyne series which contain an acitve methylene group suitable for coupling, for example, acyl acetic acid alkylamides, malonic acid or malonic acid nitrile derivatives.

In the compounds of formula I, K may, for example, be a radical of the formula

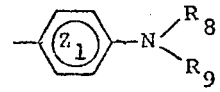

in which,
each of $R_8$ and $R_9$, which may be the same or different, signifies a hydrogen atom, an unsubstituted alkyl, phenyl or cycloalkyl radical, an alkylphenyl radical, or an alkyl radical substituted by a halogen atom, a phenyl, alkoxy, phenoxy, phenylaminocarbonyloxy, alkylcarbonyloxy, alkoxycarbonyl, hydroxy, phenylcarbonyloxy or cyano group, with the proviso that when one of $R_8$ and $R_9$ signifies a cycloalkyl, phenyl or alkylphenyl radical the other has a significance other than cycloalkyl, phenyl or alkylphenyl, which alkyl radicals or moieties in such radicals contain 1 to 4 carbon atoms, which alkoxy moieties in such radicals contain 1 to 4 carbon atoms and which cycloalkyl radical contains 5 to 7 carbon atoms, preferably cyclohexyl,
or $R_8$ and $R_9$, together with the nitrogen atom to which they are bonded form a pyrrolidine, piperidine, morpholine or piperazine ring,
$R_{10}$ signifies a hydrogen atom, an alkyl radical of 1 to 4 carbon atoms, preferably, methyl or ethyl,
$R_{11}$ signifies an alkyl radical of 1 to 4 carbon atoms, preferably a methyl radical, or a

radical,
$R_{12}$ signifies a hydrogen atom or an alkyl radical of 1 to 4 carbon atoms, preferably an ethyl radical,
$R_{13}$ signifies a hydrogen atom or an alkyl radical of 1 to 4 carbon atoms, preferably methyl,
$R_{14}$ signifies a hydroxy, amino, phenylamino or alkyl-substituted phenylamino radical, preferably, dimethylphenylamino, $R_{15}$ signifies a hydrogen atom, an alkyl radical of 1 to 4 carbon atoms unsubstituted or substituted by an alkoxy group of 1 to 4 carbon atoms, preferably methoxy, the rings $Z_1$ and $Z_2$ may be further unsubstituted or further substituted by up to two substituents selected from halogen atoms, alkyl of 1 to 4 carbon atoms and alkoxy of 1 to 4 carbon atoms, the rings $Z_3$, $Z_4$ and $Z_5$ may be further unsubstituted or may be further substituted by up to two substituents selected from halogen atoms, nitro, amino, cyano, thiocyano, hydroxyl, alkyl, alkoxy, trifluoroalkyl, trichloroalkyl, phenyl, phenoxy, alkylamino, dialkylamino, alkanoyl, alkanoyloxy, alkanoylamino, alkylsulphonyl, phenylsulphonyl, aminosulfonyl (sulfamoyl), alkylsulphonylamino, phenylsulphonylamino groups, which alkyl and alkoxy groups or moieties in such groups contain 1 to 4 carbon atoms, preferably the rings $Z_1$, $Z_2$, $Z_3$, $Z_4$ and $Z_5$, independently, are further unsubstituted or are further substituted by an alkyl of 1 to 4 carbon atoms, preferably methyl, an alkoxy of 1 to 4 carbon atoms, preferably methoxy or a halogen atom, preferably chlorine, more preferably they are further unsubstituted.

In the compounds of formula I, $n$ may signify 1 to 10, more preferably 1 to 8 and the compounds where $n$ is 3 are still more preferred.

Representative compounds of formula I, include, those of formula I',

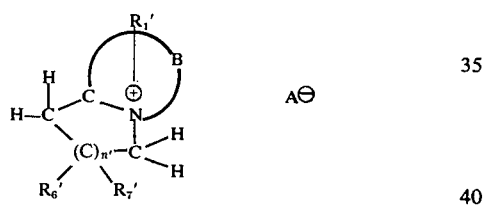

in which
B signifies a radical of formula II or IIa, in which K is as defined above,
$n'$ signifies 1 to 8,
$R'_1$ signifies an alkyl radical of 1 to 4 carbon atoms unsubstituted or substituted by a hydroxy, phenyl, ($C_{1-4}$) alkoxy or —$CONH_2$ group,
each of $R'_6$ and $R'_7$, which may be the same or different, signifies a hydrogen atom or an alkyl radical of 1 to 4 carbon atoms, preferably methyl, and
$A^\ominus$ is as defined above.

Preferred compounds of formula I, include those of formulae Ia and Ib,

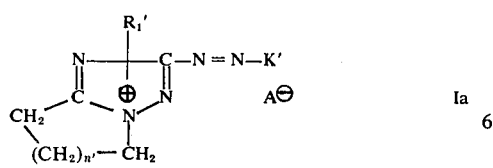 Ia

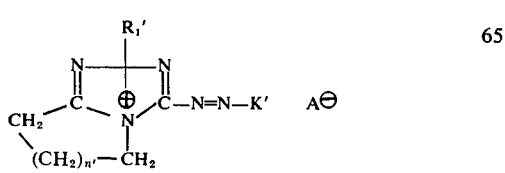

in which
$R_1'$, $A^\ominus$ and $n'$, are as defined above, and
K' signifies a radical of the formula

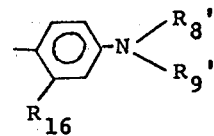

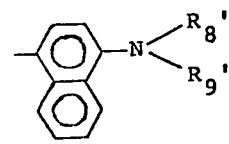

or

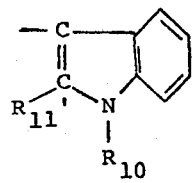

in which each of
$R_8'$ and $R_9'$, which may be the same or different signifies a hydrogen atom, an alkyl radical of 1 to 4 carbon atoms, a phenyl or methylphenyl radical or an alkyl radical of 1 to 4 carbon atoms substituted by a chlorine atom, a hydroxy, phenyl, phenoxy, ($C_{1-4}$) alkoxy, phenylcarbonyloxy, phenylaminocarbonyloxyl, ($C_{1-4}$) alkoxycarbonyl or ($C_{1-4}$) alkylcarbonyloxy group, with the proviso that when one of $R_8'$ and $R_9'$ signifies a phenyl or methylphenyl radical, the other has a significance other than phenyl or methylphenyl, or,
$R_8'$ and $R_9'$, together with the nitrogen atom to which they are bonded, form a pyrrolidine, piperidine, morpholine or piperazine ring,
$R_{16}$ signifies a hydrogen or chlorine atom, an alkyl radical of 1 to 4 carbon atoms or an alkoxy radical of 1 to 4 carbon atoms,
$R_{11}'$ signifies an alkyl radical of 1 to 4 carbon atoms or a phenyl radical, and
$R_{10}$ is as defined above.

Even more preferred compounds of formula I are those of formulae Ic and Id,

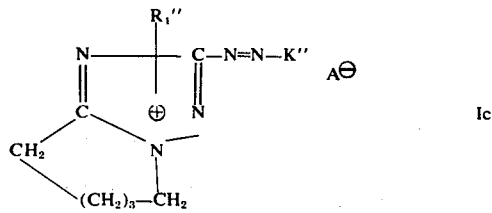 Ic

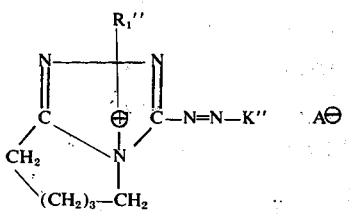

in which

A$^\ominus$ is as defined above,

R$_1$'' signifies a methyl, ethyl or —C$_2$H$_4$CONH$_2$ radical,

K'' signifies a radical of the formula

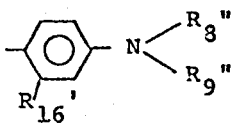

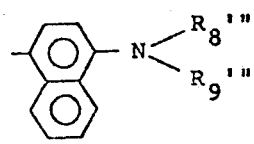

or

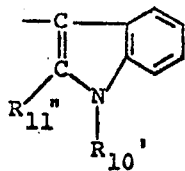

in which each of

R$_8$'' and R$_9$'', which may be the same or different, signifies a hydrogen atom an alkyl radical of 1 to 4 carbon atoms, a phenyl radical, or an alkyl radical of 1 to 4 carbon atoms substituted by a chlorine atom, a (C$_{1-4}$) alkoxy, (C$_{1-4}$) alkoxycarbonyl, phenyl, phenoxy, phenylcarbonyloxy, phenylaminocarbonyloxy, (C$_{1-4}$) alkylcarbonyloxy or hydroxy group, with the proviso that when one of R$_8$'' and R$_9$'' signifies a phenyl radical the other has a significance other than phenyl, or, R$_8$'' and R$_9$'', together with the nitrogen atom to which they are attached, form a morpholine ring, each of, R$_8$''' and R$_9$''', which may be the same or different, signifies a hydrogen atom, an alkyl radical of 1 to 4 carbon atoms, a phenyl or methylphenyl radical, or an alkyl radical of 1 to 4 carbon atoms substituted by a (C$_{1-4}$) alkoxycarbonyl group, R$_{10}$' signifies a hydrogen atom, a methyl or ethyl radical, R''$_{11}$ signifies a methyl or phenyl radical, and R$_{16}$' signifies a hydrogen or chlorine atom, a methyl or methoxy radical.

Suitable organic and inorganic anions A$^\ominus$ include halide, such as chloride, bromide or iodide, sulphate, bisulphate, methylsulphate, aminosulphonate, perchlorate, carbonate, bicarbonate, phosphate, phosphomolybdate, phosphotungstate, phosphotungstatemolybdate, benzenesulphonate, naphthalenesulphonate, 4-chlorobenzenesulphonate, oxalate, maleinate, acetate, propionate, lactate, succinate, chloroacetate, tartrate, malate, methanesulphonate or benzoate anions or complex anions such as that of zinc chloride double salts.

In the compounds of formula I, as defined above, the anion A$^\ominus$ may be exchanged for other anions. This may be done using conventional methods such as by using ion exchangers or by reacting the compound of formula I with salts or acids. The exchange may be done stepwise, for example through the hydroxide or the bicarbonate.

The compounds of formula III are known or may be prepared according to conventional methods.

The compounds of formula I, as defined above, are useful as dyes. More particularly they are useful for dyeing or printing polymeric substrates such as substrates consisting of, or containing homopolymers or copolymers of acrylonitrile or asymmetric dicyanoethylene or for dyeing or printing substrates of acid modified synthetic polyesters or polyamides. Polyamides of this type are described in Belgian Pat. No. 706,104. Polyesters of this type are described in U.S. Pat. No. 3,379,723. The substrates may be in loose fibre, yarn or fabric form.

The compounds of formula I may be converted into dyeing preparations, e.g. into stable, liquid or solid dyeing preparations, in conventional manner, e.g. by grinding or granulating or dissolving in conventional dyestuff solvents, if necessary with the addition of an assistant such as stabilizer. Such preparations may be produced, for example, in accordance with French Pat. Nos. 1,572,030 and 1,581,900.

Dyeing may be advantageously effected in an aqueous, neutral or acid medium at a temperature in the range of from 60°C to the boiling point or at temperatures over 100°C under pressure.

The dyeings obtained with the compounds of formula I are level, have stable light fastness as well as good wet fastness properties, e.g. to washing, perspiration, sublimation, pleating, decatizing, ironing, steam treatment, water, sea water, dry cleaning, crossdyeing and solvents. The dyes are soluble in water, show good compatibility with salt, good stability to boiling, good pH stability and partially reserve fibres other than those on which they are dyeable.

The compounds, which have good solubility in organic solvents, may also be used for dyeing natural or synthetic plastics or resins in the mass; they may be incorporated therein in conventional manner, for example, by milling, optionally with the use of a solvent.

The compounds are also useful for dyeing leather or paper, e.g. in the stock.

It has been found that mixtures of two or more of the compounds of formula I, or one of the compounds of formula I and other cationic dyes can be used with advantage.

The invention will be further illustrated by the following Examples in which parts and percentages are by weight and temperatures are in degrees centigrade.

EXAMPLE 1

15.2 Parts of 3-amino-5H-6,7,8,9-tetrahydro-s-triazolo[4,3-a]-azepine are dissolved in 125 parts of 85% formic acid and 15 parts of phosphoric acid and reacted with 25 parts of a 4N. aqueous sodium nitrite solution at 5 to 10°. Then the yellow diazo solution is added dropwise to a cold solution consisting of 15 parts of diethylaniline, 2 parts of amidosulphonic acid, 30 parts of glacial acetic acid and 30 parts of ice. At 5°–10° the dye solution is adjusted to pH 5.5–6.0 with an aqueous sodium hydroxide solution and stirred for 2 hours. After the addition of 60 parts of sodium chloride, the dye is filtered, washed with 100 parts of water and vacuum dried at 50°.

16.6 Parts of the dried and pulverized dye are mixed with 12 parts of 95% ethanol and 125 parts of water. 6.2 Parts of dimethyl sulphate are added and the solution is heated to 50°. The solution is cooled to room, temperature is then extracted 3 times, each time with 150 parts of trichloroethylene. The aqueous phase is mixed with 3 parts of activated charcoal and 3 parts of Hyflo. The mixture is filtered and washed with 150 parts of water. 5 Parts of zinc chloride are added, on which the dye is filtered and washed with 30 parts of a 7% aqueous sodium chloride solution.

On polyacrylonitrile and acid modified polyester the dried dye gives dyeings of fast pink shades.

EXAMPLE 2

15.2 Parts of 2-amino-5H-6,7,8,9-tetrahydro-s-triazolo[5,1-a]-azepine are diazotized as described in Example 1 and coupled to 21 parts of N-ethyl-N-benzyl-aniline, dissolved in 2 parts of amidosulphonic acid, 30 parts of glacial acetic acid and 30 parts of ice. At 5°–10° the dye solution is adjusted to pH 5.5–6.0 with an aqueous sodium hydroxide solution and stirred for 20 hours. After addition of 60 parts of sodium chloride the dye is filtered, washed with 100 parts of water and vacuum dried at 50°.

18.7 Parts of the dried and pulverized dye are quaternated with dimethyl sulphate in accordance with the method described in Example 1 and accordingly processed.

On polyacrylonitrile and acid modified polyester the dried dye gives dyeings of fast pink shades.

APPLICATION EXAMPLE A

20 Parts of the dye salt described in Example 1 or 2 and 80 parts of dextrin are ground in a pulverizing mill for 4 hours. The same dye mixture can be obtained by pasting in 100 parts of water and subsequent atomizer drying. 1 Part of the resulting preparation is pasted with 1 part of 40% acetic acid, 200 parts of demineralized water are poured in and mixture is boiled for a short time. Then it is diluted with 7000 parts of demineralizated water, 2 parts of glacial acetic acid are added and at 60° 100 parts of polyacrylonitrile fabric are entered into the bath. The fabric can be pretreated for 10–15 minutes at 60° in a bath consisting of 8000 parts of water and 2 parts of glacial acetic acid.

The bath is raised in 30 minutes to 98°–100° and the fabric boiled for 1 ½ hours and rinsed. A pink dyeing is obtained which has good fastness to light and good wet fastness properties.

10 Parts of the dye salt described in Example 1 or 2, which can be produced in accordance with the known methods from the corresponding dye halide or trichlorozincate, are dissolved in 60 parts of glacial acetic acid and 30 parts of water. A stable concentrated dye solution is obtained containing about 10% of the dye, which in accordance with the above dyeing recipe can be used for dyeing polyacrylonitrile.

APPLICATION EXAMPLE B

20 Parts of the dye described in Example 1 or 2 and 80 parts of dextrin are mixed in a ball mill for 48 hours. 1 Part of the resulting preparation is pasted with 1 part of 40% acetic acid, 200 parts of demineralization water are poured in and the mixture is boiled for a short time. The dyeing with this stock solution is effected as follows:

a. The solution is diluted with 7000 parts of demineralizated water, 21 parts of calcinated sodium sulphate, 14 parts of ammonium sulphate, 14 parts of formic acid and 15 parts of a carrier on the basis of reaction products of ethylene oxide with dichlorophenols are added and at 60° 100 parts of polyester fabric modified with acid groups are entered into the bath. The fabric can be pretreated for 10–15 minutes at 60° in a bath consisting of 8000 parts of water and 2 parts of glacial acetic acid.

The bath is raised in 30 minutes to 98°–100° and fabric boiled for one hour and rinsed. A level pink dyeing is obtained which has good wet fastness properties.

b. The solution is diluted with 3000 parts of demineralizated water, 18 parts of calcinated sodium sulphate, 6 parts of ammonium sulphate and 6 parts of formic acid are added and at 60° 100 parts of polyester fabric modified with acid groups are entered into the bath. In a closed vessel the bath is raised in 45 minutes to 110°, this temperature is kept for 1 hour with shaking, then the bath is cooled in 25 minutes to 60° and the fabric is rinsed. A level pink dyeing is obtained which has good wet fastness properties.

c. The procedure, described in b. above, is followed, but the bath in the closed vessel is heated in 1 hour to 120°.

The structural composition of further dyes is given in the following Table I. They can be produced in accordance with Examples 1 and 2 and agree with the formula

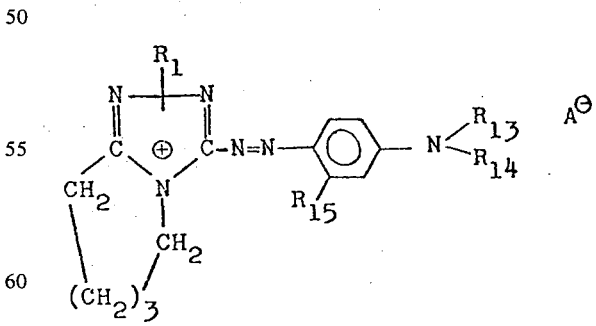

where $R_1$, $R_{13}$, $R_{14}$ and $R_{15}$ have the significances given in the table.

Suitable anions $A^\ominus$ are those indicated in the above description.

Table I

| | $R_1$ | $R_{15}$ | $R_{13}$ | $R_{14}$ | Shade of dyeing on polyacrylonitrile |
|---|---|---|---|---|---|
| 3 | —$CH_3$ | H | —$C_2H_5$ | —$CH_2$—⌬ | bluish red |
| 4 | do. | H | —$CH_2$—⌬ | do. | yellowish red |
| 5 | do. | H | —$CH_3$ | do. | bluish red |
| 6 | do. | H | —$C_2H_5$ | —$C_2H_4$—O—$CH_3$ | do. |
| 7 | do. | H | do. | —$C_2H_4$—O—⌬ | do. |
| 8 | do. | H | —$C_2H_4O$—⌬ | —$C_2H_4$—O—⌬ | red |
| 9 | do. | H | —$C_2H_5$ | —$C_2H_4$—O—C(=O)—⌬ | bluish red |
| 10 | do. | H | —$C_2H_5$ | —$C_2H_4OC(O)$—NH—⌬ | bluish red |
| 11 | do. | H | do. | —$C_2H_4Cl$ | bluish red |
| 12 | do. | H | —$C_2H_4Cl$ | —$C_2H_4Cl$ | red |
| 13 | do. | H | —$C_2H_5$ | —$C_2H_4COOC_2H_5$ | do. |
| 14 | do. | H | do. | —$C_2H_4OH$ | bluish red |
| 15 | do. | H | —$CH_3$ | ⌬ | ruby |
| 16 | do. | —$CH_3$ | —$C_2H_5$ | —$C_2H_5$ | bluish red |
| 17 | do. | —$OCH_3$ | do. | —$cH_2$—⌬ | do. |
| 18 | do. | Cl | do. | do. | scarlet |
| 19 | —$C_2H_5$ | H | do. | —$C_2H_5$ | bluish red |
| 20 | —$C_2H_5$ | H | —$C_2H_5$ | —$CH_2$—⌬ | red |
| 21 | —$C_2H_4CONH_2$ | H | do. | —$C_2H_5$ | red |
| 21a | —$CH_3$ | H | —$CH_3$ | —$C_2H_4$—$COOC_4H_9$ | |

The structural composition of further dyes is given in the following Table II. They can be produced in accordance with Examples 1 and 2 and agree with the formula

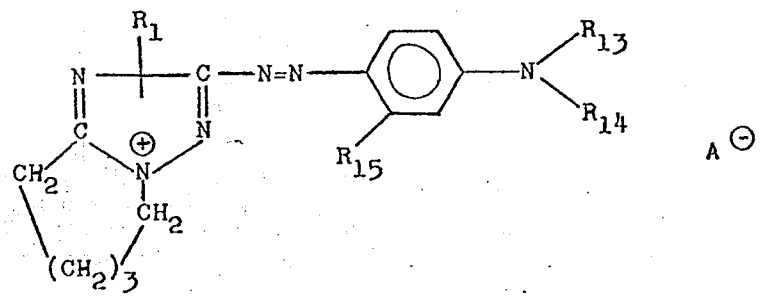

where $R_1$, $R_{13}$, $R_{14}$ and $R_{15}$ have the significances given in the table.

Suitable anions $A^\ominus$ are those indicated in the above description.

Table II

| | $R_1$ | $R_{15}$ | $R_{13}$ | $R_{14}$ | Shade of dyeing on polyacrylonitrile |
|---|---|---|---|---|---|
| 22 | —$CH_3$ | H | —$C_2H_5$ | —$C_2H_5$ | bluish red |
| 23 | do. | H | —$CH_2$—⌬ | —$CH_3$ | bluish red |
| 24 | do. | H | —$CH_3$ | do. | bluish red |
| 25 | do. | H | —$C_2H_5$ | —$C_2H_4$—O—⌬ | do. |
| 26 | do. | H | do. | —$C_2H_4$—OC(=O)—NH—⌬ | red |
| 27 | do. | H | —$C_2H_5$ | —$C_2H_4Cl$ | bluish red |
| 28 | do. | H | —$C_2H_4Cl$ | —$C_2H_4Cl$ | red |

Table II-continued

| | $R_1$ | $R_{15}$ | $R_{13}$ | $R_{14}$ | Shade of dyeing on polyacrylonitrile |
|---|---|---|---|---|---|
| 29 | do. | H | —$CH_3$ |  | ruby |
| 30 | do. | —$CH_3$ | —$C_2H_5$ | —$C_2H_5$ | bluish red |
| 31 | —$C_2H_5$ | H | do. | do. | bluish |

The structural composition of further dyes is given in the following Table III. They can be produced in accordance with Examples 1 and 2 and agree with the formula

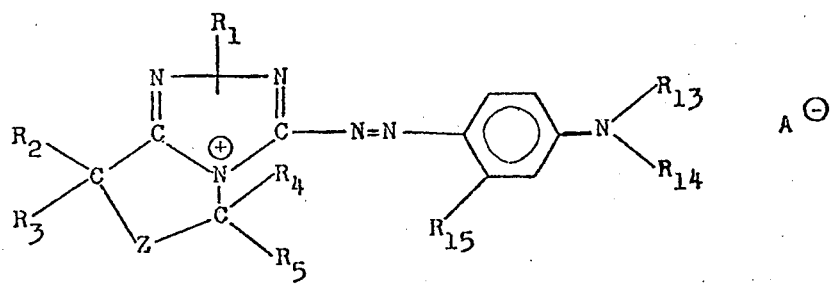

where $R_1 - R_5$, $R_{13} - R_{15}$ and Z have the significances given in the Table III.

Suitable anions $A^{\ominus}$ are those indicated in the above description.

The structural composition of further dyes is given in the following Table IV. They can be produced in accordance with Examples 1 and 2 and agree with the formula

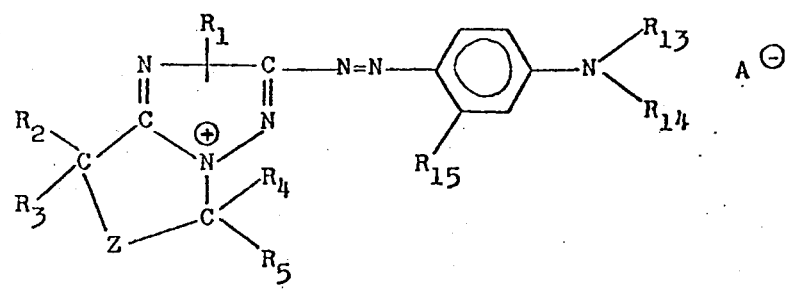

where $R_1 - R_5$, $R_{13} - R_{15}$ and Z have the significances given in the Table IV.

Suitable anions $A^{\ominus}$ are those indicated in the above description.

Table III

| | $R_1$ | $R_2$ | $R_3$ | $R_4$ | $R_5$ | Z | $R_{13}$ | $R_{14}$ | $R_{15}$ | Shade of dyeing on polyacrylonitrile |
|---|---|---|---|---|---|---|---|---|---|---|
| 32 | —$CH_3$ | H | H | H | H | —$CH_2$— | —$C_2H_5$ | —$C_2H_5$ | H | bluish red |
| 33 | do. | H | H | H | H | —$(CH_2)_2$— | do. | do. | H | do. |
| 34 | do. | H | H | H | H | —$(CH_2)_4$— | do. | do. | H | do. |
| 35 | do. | H | H | H | H | —$(CH_2)_5$— | do. | do. | H | do. |
| 36 | do. | H | H | H | H | —$(CH_2)_6$— | do. | do. | H | do. |
| 37 | do. | H | H | H | H | —$(CH_2)_7$— | do. | do. | H | do. |
| 38 | do. | H | H | H | H | —$(CH_2)_8$— | do. | do. | H | do. |
| 39 | do. | H | H | H | H | —$(CH_2)_9$— | do. | do. | H | do. |
| 40 | do. | H | H | H | H | —$(CH_2)_{10}$— | do. | do. | H | do. |
| 41 | do. | H | H | H | H | —$C(CH_3)_2$ | do. | do. | H | do. |
| 42 | —$C_2H_5$ | H | H | H | H | —$(CH_2)_4$— | —$C_2H_5$ | —$CH_2$- | H | do. |
| 43 | do. | H | H | H | H | do. | do. | —$C_2H_5$ | —$CH_3$ | do. |
| 44 | —$C_2H_5$ | H | H | H | H | do. | do. | do. | H | do. |
| 45 | —$C_2H_4CONH_2$ | H | H | H | H | —$(CH_2)_4$— | —$C_2H_5$ | —$C_2H_5$ | H | bluish red |
| 46 | —$CH_3$ | —$CH_3$ | H | —$CH_3$ | H | do. | do. | do. | H | do. |
| 47 | do. | do. | —$CH_3$ | do. | —$CH_3$ | do. | do. | do. | H | do. |

Table IV

| | $R_1$ | $R_2$ | $R_3$ | $R_4$ | $R_5$ | Z | $R_{13}$ | $R_{14}$ | $R_{15}$ | Shade of dyeing on polyacrylonitrile |
|---|---|---|---|---|---|---|---|---|---|---|
| 48 | —$CH_3$ | H | H | H | H | —$CH_2$— | —$C_2H_5$ | —$C_2H_5$ | H | bluish red |
| 49 | do. | H | H | H | H | —$(CH_2)_2$— | do. | do. | H | do. |
| 50 | do. | H | H | H | H | —$(CH_2)_{10}$— | do. | do. | H | do. |
| 51 | —$C_2H_5$ | H | H | H | H | —$(CH_2)_4$— | do. | do. | H | do. |
| 52 | —$C_2H_4CONH_2$ | H | H | H | H | do. | do. | do. | H | do. |

The structural composition of further dyes is given in the following Table V. They can be produced in accordance with Examples 1 and 2 and agree with the formula

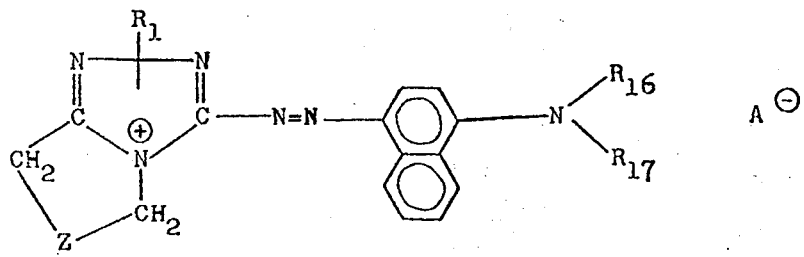

where $R_1$, $R_{16}$, $R_{17}$ and Z have the significances given in the table.

Suitable anions $A^\ominus$ are those indicated in the above description.

Table V

| | $R_1$ | Z | $R_{16}$ | $R_{17}$ | Shade of dyeing on polyacrylonitrile |
|---|---|---|---|---|---|
| 53 | —$CH_3$ | —$CH_2$— | —$C_2H_5$ | —$CH_3$ | reddish violet |
| 54 | do. | do. | —$C_2H_4COOC_4H_9$ | do. | do. |
| 55 | do. | —$(CH_2)_2$— | do. | do. | do. |
| 56 | do. | —$(CH_2)_3$— | —$C_2H_5$ | do. | do. |
| 57 | do. | do. | —$C_2H_4COOC_4H_9$ | do. | do. |
| 58 | —$C_2H_5$ | do. | —$C_2H_5$ | —$C_2H_5$ | do. |

The structural composition of further dyes is given in the following Table VI. They can be produced in accordance with Examples 1 and 2 and agree with the formula

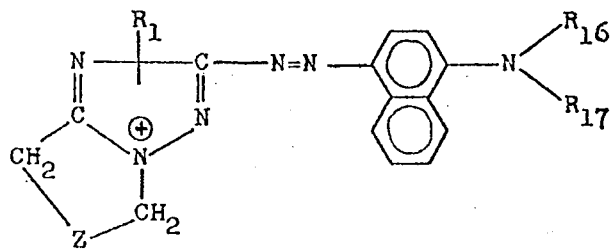

where $R_1$, $R_{16}$, $R_{17}$ and Z have the significances given in the table.

Suitable anions $A^\ominus$ are those indicated in the above description.

Table VI

| | $R_1$ | Z | $R_{16}$ | $R_{17}$ | Shade of dyeing on polyacrylonitrile |
|---|---|---|---|---|---|
| 59 | —$CH_3$ | —$(CH_2)_3$— | —$C_2H_5$ | —$CH_3$ | reddish violet |
| 60 | do. | do. | —$C_2H_4COOC_4H_9$ | do. | do. |
| 61 | —$C_2H_5$ | do. | —$C_2H_5$ | —$C_2H_5$ | do. |

The structural composition of further dyes is given in the following Table VII. They can be produced in accordance with Examples 1 and 2 and agree with the formula

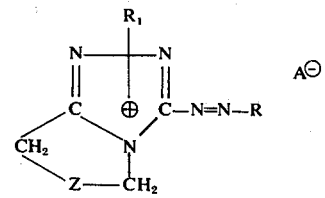

where R, $R_1$ and Z have the significances given in the table.

Suitable anions $A^\ominus$ are those indicated in the above description.

Table VII

| | Z | $R_1$ | R | Shade of dyeing on polyacrylonitrile |
|---|---|---|---|---|
| 62 | —$(CH_2)_3$— | —$CH_3$ | 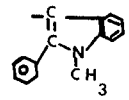 | yellow |

Table VII-continued
| | Z | R₁ | R | Shade of dyeing on poly-acrylonitrile |
|---|---|---|---|---|
| 63 | do. | do. | 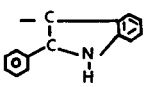 | do. |
| 64 | do. | do. | 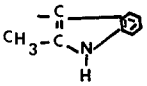 | do. |
| 65 | do. | do. | 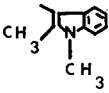 | do. |
| 66 | —(CH₂)₃— | do. |  | brownish red |
| 67 | —(CH₂)₃— | do. | 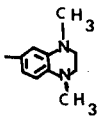 | bluish red |
| 68 | —(CH₂)₃— | do. |  | orange |
| 69 | —(CH₂)₃— | do. |  | reddish yellow |
| 70 | —(CH₂)₃— | —CH₃ | 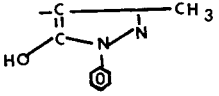 | |
| 71 | —(CH₂)₃— | do. | 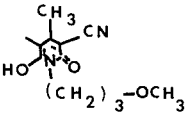 | do. |
| 72 | —CH₂— | do. | 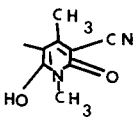 | reddish yellow |
| 73 | —(CH₂)₃— | do. | do. | do. |
| 74 | —(CH₂)₃— | do. | 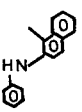 | red |

Table VII-continued

| | Z | R₁ | R | Shade of dyeing on polyacrylonitrile |
|---|---|---|---|---|
| 75 | —(CH₂)₃— | —CH₃ | 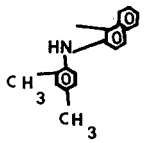 | bluish red |
| 76 | —(CH₂)₃— | do. |  | scarlet |
| 77 | —CH₂— | do. | 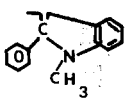 | reddish yellow |
| 78 | —(CH₂)₃— | do. | 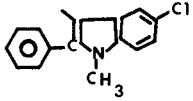 | do. |
| 79 | —(CH₂)₂— | do. | do. | do. |

The structural composition of further dyes is given in the folowing Table VIII. They can be produced in accordance with Examples 1 and 2 and agree with the formula

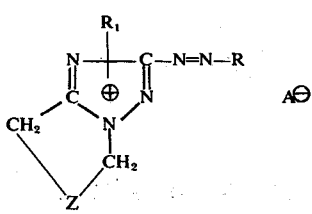

where R, R₁ and Z have the significances given in the table.

Suitable anions $A^\ominus$ are those indicated in the above description.

Table VIII

| | Z | R₁ | R | Shade of dyeing on polyacrylonitrile |
|---|---|---|---|---|
| 80 | —CH₂— | —CH₃ | 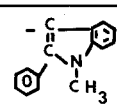 | yellow |
| 81 | —(CH₂)₂— | do. | do. | do. |
| 82 | —(CH₂)₃— | do. | do. | do. |
| 83 | —(CH₂)₃— | do. | 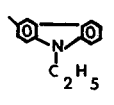 | brownish red |
| 84 | —(CH₂)₃— | —CH₃ | 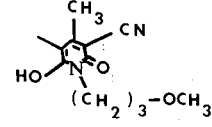 | reddish yellow |

Table VIII-continued
| | Z | R₁ | R | Shade of dyeing on polyacrylonitrile |
|---|---|---|---|---|
| 85 | —(CH₂)₃— | do. | ![structure] | do. |
| 86 | —(CH₂)₃— | do. | ![structure] | red |
| 87 | —(CH₂)₃— | —CH₃ | ![structure] | bluish red |
| 88 | —(CH₂)₃— | do. | ![structure] | scarlet |
On polyacrylonitrile the dyes of the following Examples give dyeings which have also good fastness properties.
Example 89
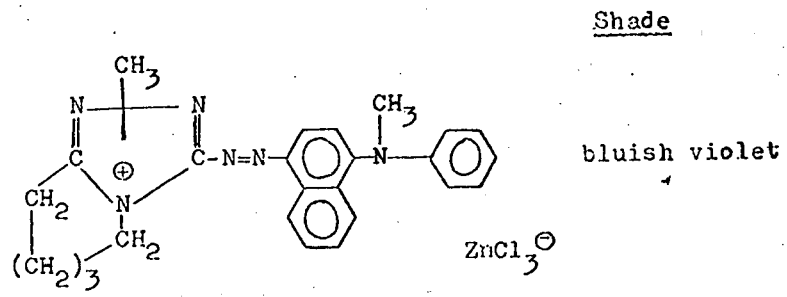
Shade
bluish violet
Example 90
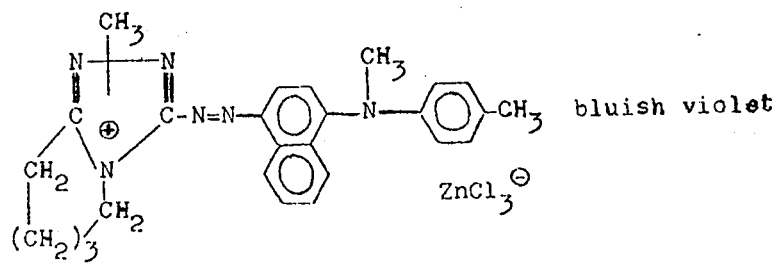
bluish violet Example 91
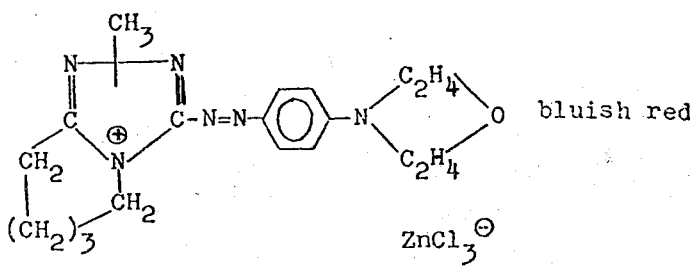
Shade
bluish red
Formulae of representative dyes of the foregoing Examples are as follows:
Example 1
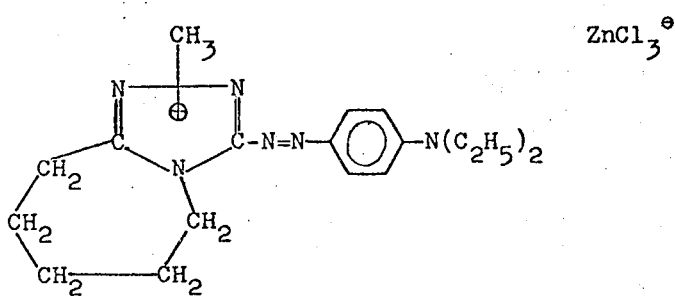
Example 5
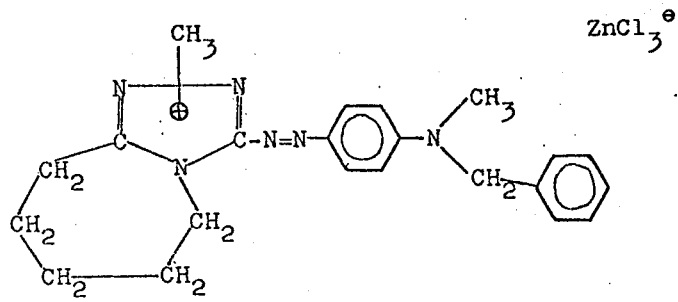
Example 22
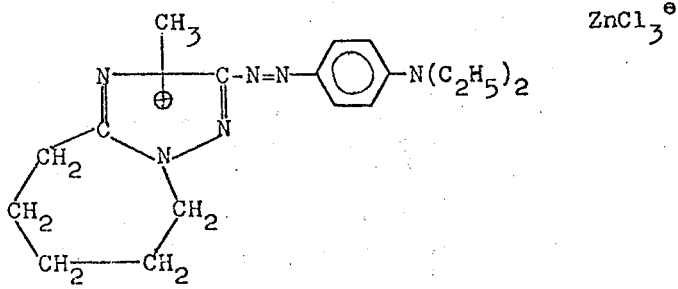

Example 33

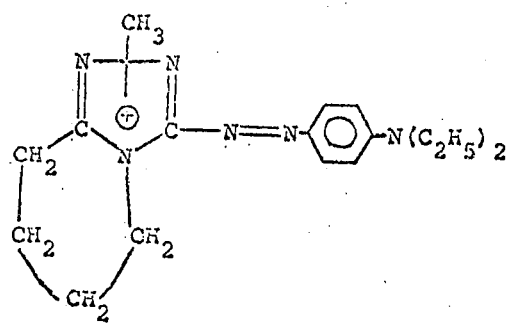

ZnCl$_3^\ominus$

Example 57

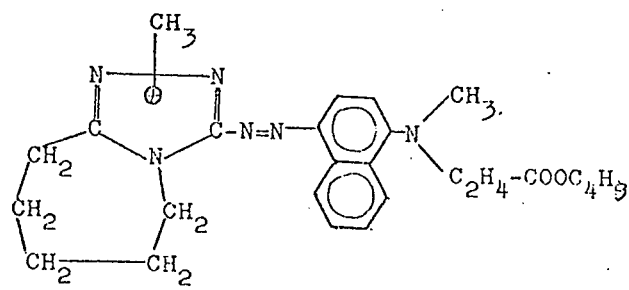

ZnCl$_3^\ominus$

Example 62

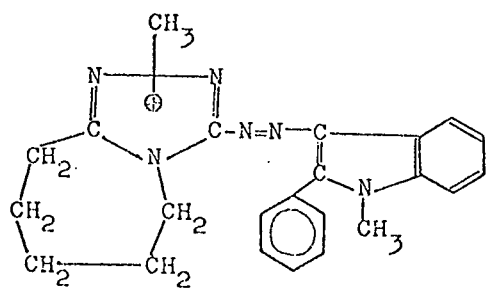

Cl$^\ominus$

What is claimed is:
1. A dye of the formula

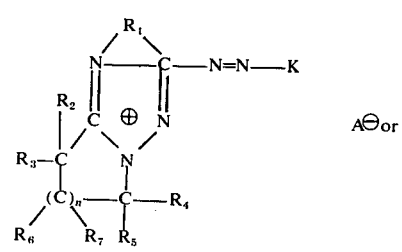  A$^\ominus$ or

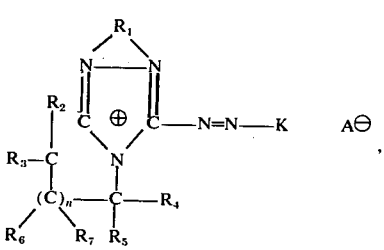  A$^\ominus$ wherein
$R_1$ is alkyl, alkyl monosubstituted by hydroxy, phenyl, alkoxy or carbamoyl, alkenyl of 2 to 4 carbon atoms, alkoxy or cycloalkyl of 5 to 7 carbon atoms,
each $R_2$, $R_3$, $R_4$, $R_5$, $R_6$ and $R_7$ is independently hydrogen, alkyl, cycloalkyl of 5 to 7 carbon atoms or phenyl, K is 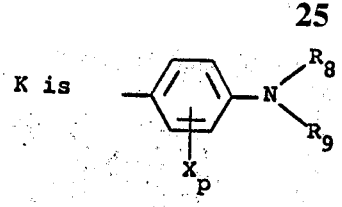

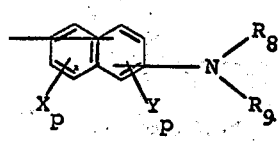 , 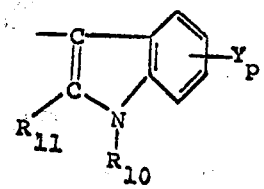 ,

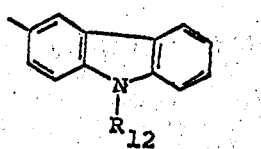 , 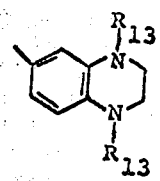 ,

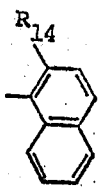 , 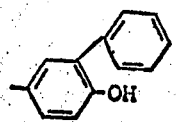 ,

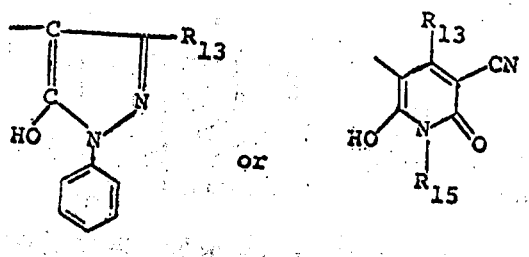 , wherein each of $R_8$ and $R_9$ is independently hydrogen, alkyl, phenyl, cycloalkyl of 5 to 7 carbon atoms, alkylphenyl or alkyl monosubstituted by halo, phenyl, alkoxy, phenoxy, phenylcarbamoyloxy, alkylcarbonyloxy, alkoxycarbonyl, hydroxy, benzoyloxy or cyano, with the proviso that when $R_8$ or $R_9$ is phenyl, cycloalkyl of 5 to 7 carbon atoms or alkylphenyl, the other is other than phenyl, cycloalkyl of 5 to 7 carbon atoms or alkylphenyl, or $R_8$ and $R_9$ taken together and with the nitrogen atom to which they are joined are pyrrolidino, piperidino, morpholino or piperazino, $R_{10}$ is hydrogen or alkyl $R_{11}$ is alkyl or

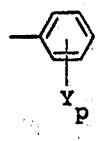 , $R_{12}$ is hydrogen or alkyl, each $R_{13}$ is independently hydrogen or alkyl, $R_{14}$ is hydroxy, amino, anilino or anilino monosubstituted or disubstituted by alkyl, $R_{15}$ is hydrogen, alkyl or alkoxyalkyl, each X is independently halo, alkyl or alkoxy, each Y is independently halo, nitro, amino, cyano, thiocyano, hydroxy, alkyl, alkoxy, trifluoroalkyl, trichloroalkyl, phenyl, phenoxy, alkylamino, dialkylamino, alkylcarbonyl, alkylcarbonyloxy, alkylcarbonylamino, alkylsulfonyl, phenylsulfonyl, sulfamoyl, alkylsulfonylamino or phenylsulfonylamino, and each $p$ is independently 0 to 2, $A^\ominus$ is an anion, and $n$ is 1 to 10, wherein each alkyl, alkoxy, alkyl moiety and alkoxy moiety independently has 1 to 4 carbon atoms.

2. A dye according to claim 1 wherein $A^\ominus$ is zinc trichloride, chloride, acetate or methanesulfonate.

3. A dye according to claim 1 wherein

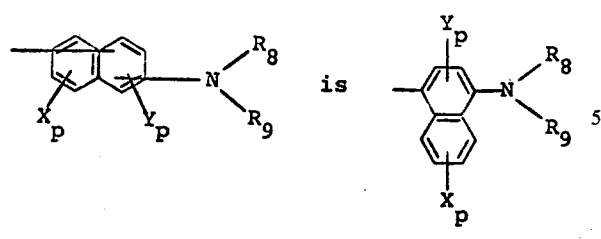 is

4. A dye according to claim 1 wherein
X is halo, alkyl or alkoxy,
Y is halo, alkyl or alkoxy, and each p is independently 0 or 1.

5. A dye according to claim 4 wherein each p is 0.

6. A dye according to claim 4 wherein $A^\ominus$ is zinc trichloride, chloride, acetate or methanesulfonate.

7. A dye according to claim 4 having the formula

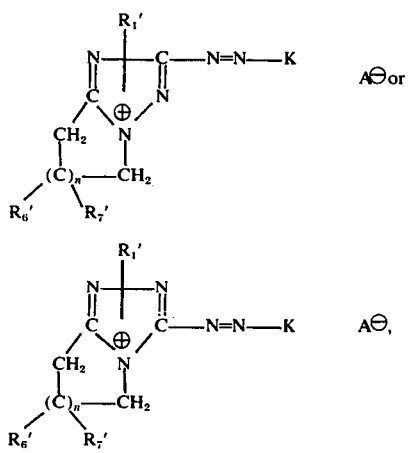

wherein
$R_1'$ is alkyl or alkyl monosubstituted by hydroxy, phenyl, alkoxy or carbamoyl,
$R_6'$ is hydrogen or alkyl,
$R_7'$ is hydrogen or alkyl,
$A^\ominus$ is an anion, and
n is 1 to 10.

8. A dye according to claim 7 having the formula

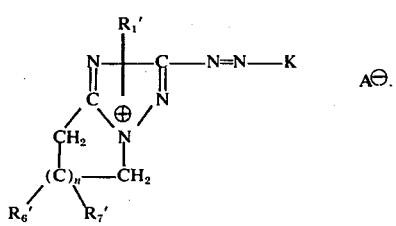

9. A dye according to claim 8 having the formula

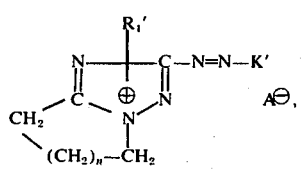

wherein
$R'_1$ is alkyl or alkyl monosubstituted by hydroxy, phenyl, alkoxy or carbamoyl, K' is 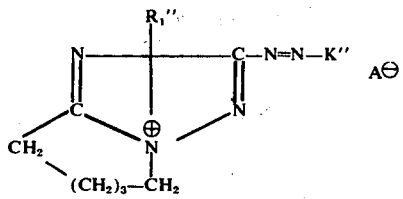

or 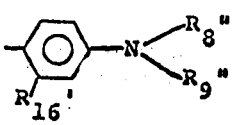

wherein each of
$R'_8$ and $R'_9$ is independently hydrogen, alkyl, phenyl, methylphenyl or alkyl monosubstituted by chloro, hydroxy, phenyl, phenoxy, alkoxy, benzoyloxy, phenylcarbamoyloxy, alkoxycarbonyl or alkylcarbonyloxy, with the proviso that when $R'_8$ or $R'_9$ is phenyl or methylphenyl, the other is other than phenyl or methylphenyl, or
$R'_8$ and $R'_9$ taken together and with the nitrogen atom to which they are joined are pyrrolidino, piperidino, morpholino or piperazino,
$R_{10}$ is hydrogen or alkyl,
$R'_{11}$ is alkyl or phenyl, and
$R_{16}$ is hydrogen, chloro, alkyl or alkoxy,
$A^\ominus$ is an anion, and
n is 1 to 10.

10. A dye according to claim 9 having the formula

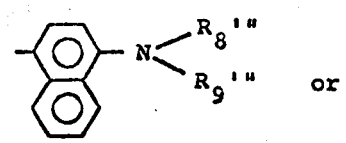

wherein $R''_1$ is methyl, ethyl or 2-carbamoylethyl,

K'' is 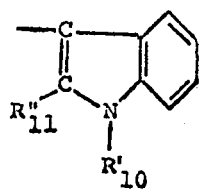 , or wherein each
of R''$_8$ and R''$_9$ is independently hydrogen, alkyl, phenyl or alkyl monosubstituted by chloro, alkoxy, alkoxycarbonyl, phenyl, phenoxy, benzoyloxy, phenylcarbamoyloxy, alkylcarbonyloxy or hydroxy, with the proviso that when R''$_8$ or R''$_9$ is phenyl, the other is other than phenyl, or R''$_8$ and R''$_9$ taken together and with the nitrogen atom to which they are joined are morpholino,
each of R'''$_8$ and R'''$_9$ is independency hydrogen, alkyl, phenyl, methylphenyl or alkoxycarbonylalkyl, with the proviso that when R'''$_8$ or R'''$_9$ is phenyl or methylphenyl, the other is other than phenyl or methylphenyl, R'$_{10}$ is hydrogen, methyl or ethyl,
R''$_{11}$ is methyl or phenyl, and
R'$_{16}$ is hydrogen, chloro, methyl or methoxy, and
A$^\ominus$ is an anion.

11. A dye according to claim 10 wherein R'$_{16}$ is hydrogen.

12. A dye according to claim 11 having the formula

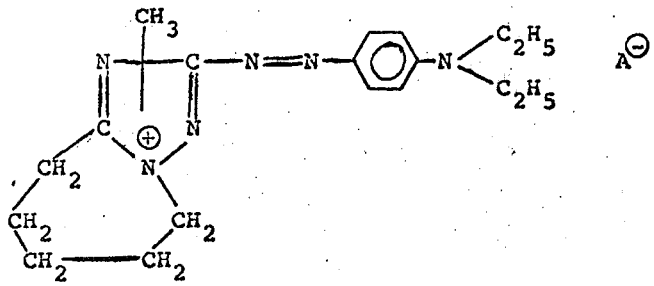

13. A dye according to claim 12 wherein A$^\ominus$ is ZnCl$_3^\ominus$.

14. A dye according to claim 7 having the formula

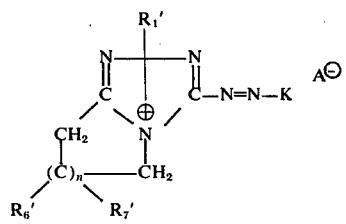

15. A dye according to claim 14 having the formula

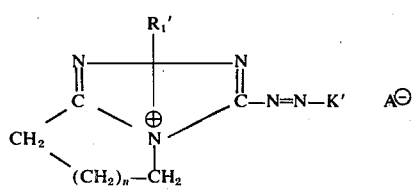

wherein R'$_1$ is alkyl or alkyl monosubstituted by hydroxy, phenyl, alkoxy or carbamoyl, K' is 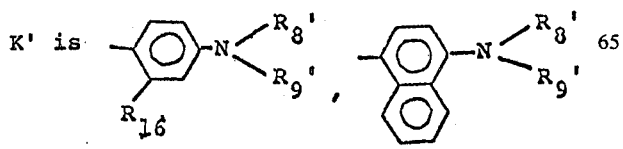

or 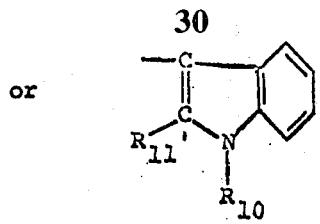, wherein each
of R'$_8$ and R'$_9$ is independently hydrogen, alkyl, phenyl, methylphenyl or alkyl monosubstituted by chloro, hydroxy, phenyl, phenoxy, alkoxy, benzoyloxy, phenylcarbamoyloxy, alkoxycarbonyl or alkylcarbonyloxy, with the proviso that when R'$_8$ or R'$_9$ is phenyl or methylphenyl, the other is other than phenyl or methylphenyl, or R'$_8$ and R'$_9$ taken together and with the nitrogen atom to which they are joined are pyrrolidino, piperidino, morpholino or piperazino,
R$_{10}$ is hydrogen or alkyl,
R'$_{11}$ is alkyl or phenyl, and
R$_{16}$ is hydrogen, chloro, alkyl or alkoxy,
A$^\ominus$ is an anion, and
n is 1 to 10.

16. A dye according to claim 15 having the formula

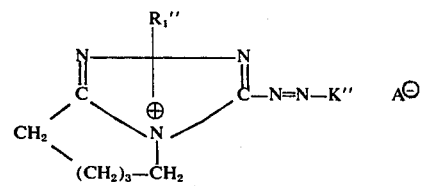

wherein R''$_1$ is methyl, ethyl or 2-carbamoylethyl,

K'' is 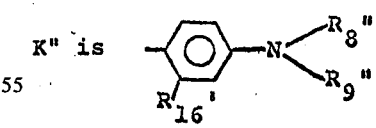,

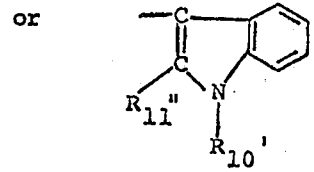

or 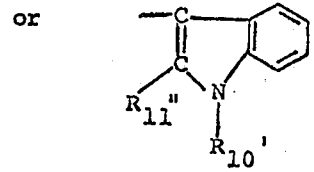, wherein each of
R″₈ and R″₉ is independently hydrogen, alkyl, phenyl or alkyl monosubstituted by chloro, alkoxy, alkoxycarbonyl, phenyl, phenoxy, benzoyloxy, phenylcarbamoyloxy, alkylcarbonyloxy or hydroxy, with the proviso that when R″₈ or R″₉ is phenyl, the other is other than phenyl, or R″₈ and R″₉ taken together and with the nitrogen atom to which they are joined are morpholino, each of R‴₈ and R‴₉ is independently hydrogen, alkyl, phenyl, methylphenyl or alkoxycarbonylalkyl, with the proviso that when R‴₈ or R‴₉ is phenyl or methylphenyl, the other is other than phenyl or methylphenyl, R′₁₀ is hydrogen, methyl or ethyl,
R″₁₁ is methyl or phenyl, and
R′₁₆ is hydrogen, chloro, methyl or methoxy, and
A⊖ is an anion.

17. A dye according to claim 16 wherein R′₁₆ is hydrogen.

18. A dye according to claim 17 having the formula

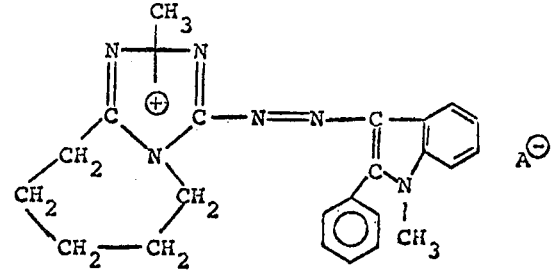

19. A dye according to claim 18 wherein A⊖ is ZnCl₃⊖.

20. A dye according to claim 17 having the formula

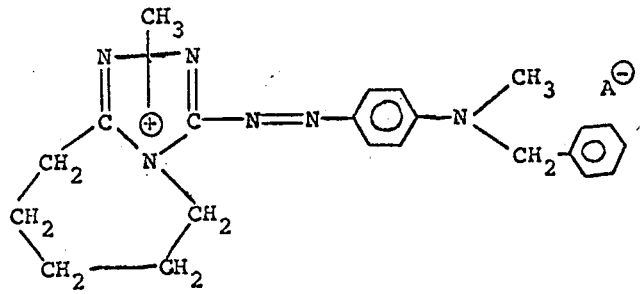

21. A dye according to claim 20 wherein A⊖ is ZnCl₃⊖.

22. A dye according to claim 17 having the formula

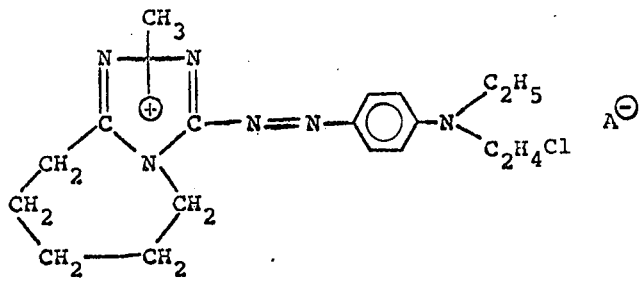

23. A dye according to claim 17 having the formula

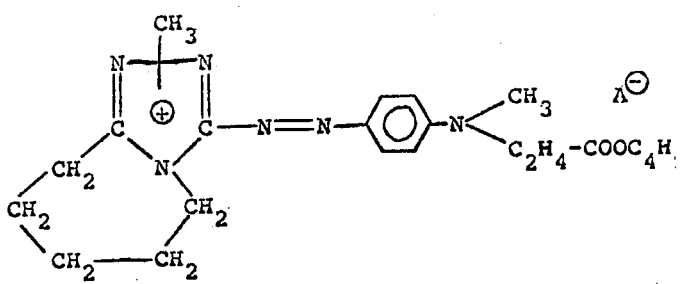

24. A dye according to claim 17 having the formula

25. A dye according to claim 24 wherein $A^{\ominus}$ is $Cl^{\ominus}$.
26. A dye according to claim 17 having the formula
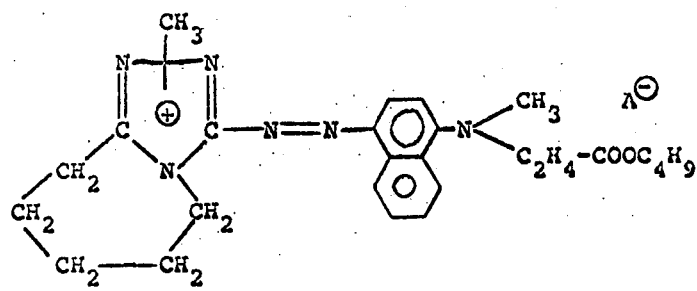
* * * * *